3,478,626
CONTROLLED FEED SYSTEM
George A. Stelmach, Butler, Pa., assignor to Blaw-Knox
 Company, Pittsburgh, Pa., a corporation of Delaware
Filed Mar. 14, 1967, Ser. No. 622,998
Int. Cl. B23b *3/28;* B23c *1/16, 1/18*
U.S. Cl. 82—14                                    13 Claims

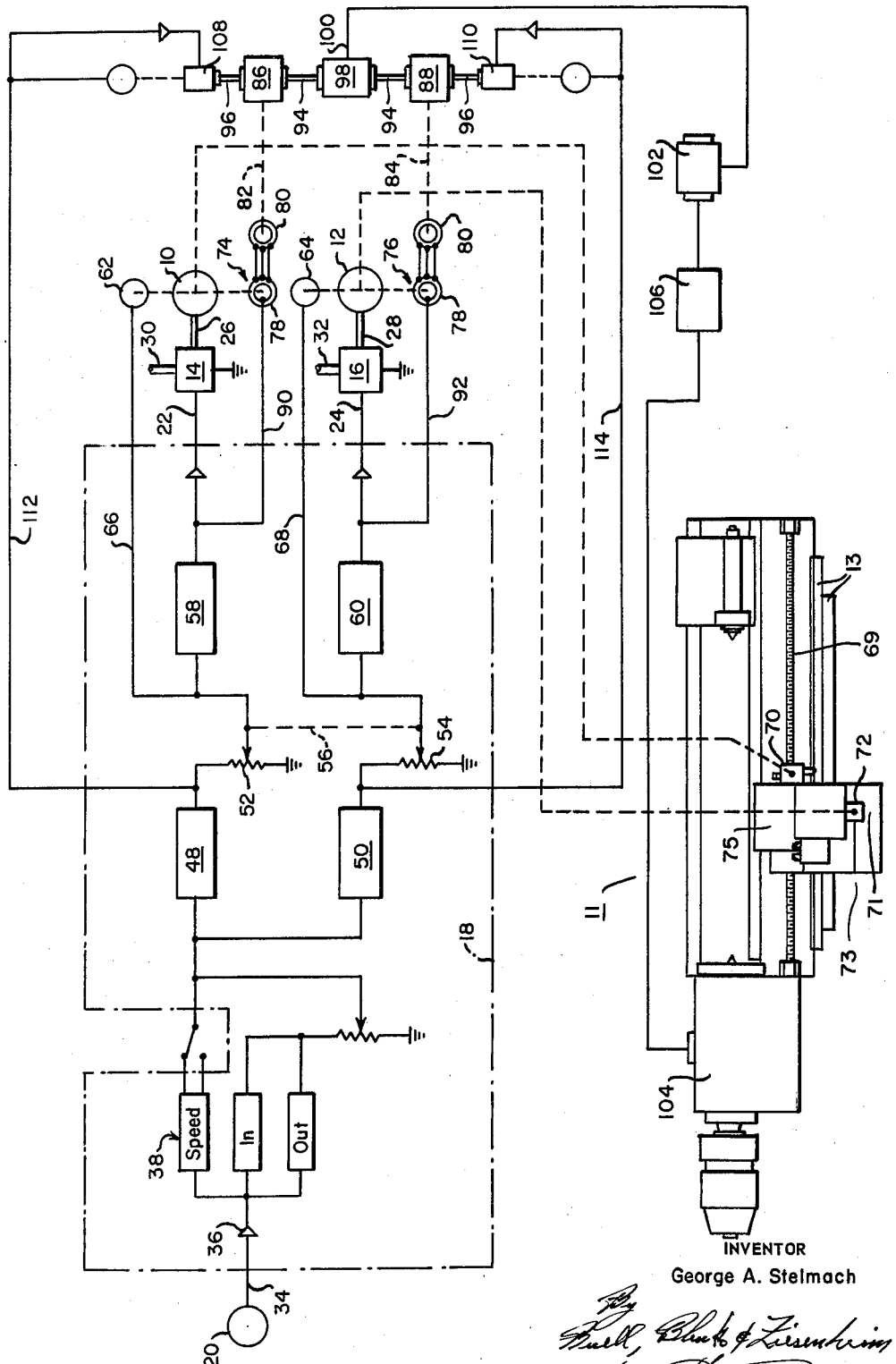
INVENTOR
George A. Stelmach

ABSTRACT OF THE DISCLOSURE

The controlled feed system, when applied to lathes, carefully controls the tool feed pattern in both the longitudinal and cross-feed directions which are expressed in fractional inches per revolution of the headstock or lathe spindle in each feed direction. Error signals are generated, which are composite reference signals, the value of which are determined both by template tracer position and by adjustable signal reference means controlled by the rotary speed of the headstock. Hydraulic motors are employed for driving the longitudinal lathe carriage and the cross slide. The hydraulic motors are controlled respectively by component output signals of the tracing head circuit, and each of the motors is regulated by a tachometer feedback circuit. The motors are additionally controlled by the outputs of mechanical differentials, respectively, which in turn are controlled both by the tracing head component signals and by the speed of the lathe headstock. The differentials are coupled through synchro systems to the drive motors to generate the error signals. The error signals are fed back to the motor energizing circuits, or in the case of hydraulic motors, to their respective servo-valves. Thus, the error signal produced by one differential is related to both the X component position signal of the tracing head and to the lathe spindle speed while the error signal of the other differential is related both to the Y component position signal and to the lathe spindle speed.

---

The present invention relates to a controlled feed system and more particularly to feed systems of the character described for automatically controlling the feed patterns of a tool or the like utilized with a lathe or other production equipment.

The invention permits more accurate regulation of servo-controlled hydraulic motors over a larger area of speeds than heretofore possible. In comparison with conventional speed regulating systems, the tachometer feedback system usually associated therewith is replaced in accordance with the invention by a system which utilizes position-regulated speed controls. In tachometer feedback systems, two control signals or voltages must be compared, i.e., a reference voltage and the tachometer feedback voltage, to regulate the speed of the hydraulic motors and other driving means controlled thereby. Speed regulation in this manner produces inaccurate results particularly in the low speed ranges. In accordance with the present invention, as described more fully below, my novel regulating system compares the position of an output shaft or the like of a synchronous speed governing system to the position of the output shaft or the like of the associated driving means in order to ensure an accurate regulation of the speed of the driving means.

Although the invention has been described in detail below with reference to an automatic lathe, it will be obvious as this description proceeds that the invention is of general utility in the field of speed regulation.

The invention is particularly useful in those applications wherein the movements of a tool or the like are automatically controlled as through the use of a template and tracing head. In an automatic lathe, for example, the tracing head output is converted into X and Y tracing signal components, related to tracing head position, for controlling respectively the longitudinal and cross-feed movements of the lathe tool.

Previous tracer-controlled feed arrangements have utilized signals produced by the tracing head circuit to actuate two servo-valves which in turn control a pair of hydraulic drives for the longitudinal and cross-feed respectively. The hydraulic drives each have connected thereto a tachometer, the signal of which is fed back to regulate the speed of the associated drive by comparing the feedback signal to a standard or reference signal to produce a differential speed control signal, which in turn is applied to the hydraulic drive to compensate for load variations to which the lathe or other equipment is subjected. While this arrangement is satisfactory for many applications, the control circuit tends to lag on initial response to relatively large command signals. Moreover, the tachometer feedback becomes inaccurate at low operating speeds and is further limited by the maximum speed of which the tachometer is capable. More importantly, however, the tool feed pattern provided by this and other servo-control circuits is irregular in those applications where the contour of a workpiece changes along the tool path, for example where the circumference of the workpiece varies along the length or axis thereof as in roll grinding or dressing applications where the roll is provided with a crown.

In order to optimize tool life and to maximize tool cutting speeds and otherwise to provide a uniformity of turning quality along the length of the workpiece, it is essential that the tool feed pattern, in both the longitudinal and cross-feed directions be carefully controlled in order to produce a uniform tool feed, which may be expressed in fractional inches per revolution of the headstock or lathe spindle in each feed direction.

The present invention provides a novel arrangement for controlling a lathe tool or the like and for relating movements of the tool to a template frequently utilized in the operation of automatic lathes and similarly controlled production machinery. The feed control system of the invention makes possible the generation of error or correction signals which are composite reference signals, the value of which are determined by template tracer position and by adjustable signal reference means controlled by workpiece speed. The error signals are employed to regulate longitudinal and cross-feed rates in fractional inches per revolution of the workpiece.

More particularly the fractional inches per revolution feed control system of the invention includes suitable driving means, such as hydraulic motors for driving the longitudinal carriage and the cross slide on which the tool is mounted in the case of a lathe. The hydraulic motors are driven respectively by component output signals of the tracing head circuit which vary with the position of the head. Each of the motors is controlled by a tachometer feedback circuit, and additionally is controlled by the output of a mechanical multiplier or differential. The differentials in turn are related respectively to the tracing head component signals and to the rotative speed of the workpiece or, in the case of a lathe, to the speed of the headstock or lathe spindle.

In the case of hydraulic motors, servo-valves controlled respectively by the tracing head signal components can be used for energizing the tool feeds operatively coupled to the hydraulic motors. Other driving means can be substituted as long as they are capable of being controlled by the tracing head signals.

The differentials are coupled respectively to the tool feed driving means to govern the driving means through the generation of error signals which are related both to the tracing head position and to the workpiece position or, more specifically, to the rotational speed thereof. In the case of a lathe, one of the thus generated error signals is related both to an X component position signal and to the lathe spindle speed while the other error signal is related both to a Y component position signal and to the lathe spindle speed.

In one arrangement, the differentials are coupled respectively through synchro systems to the driving means and the error signals which are generated thereby, are fed back to the driving means energizing circuits, or, in the case of the aforementioned hydraulic motors, to their respective servo-valves. The error signals produced by the governors control the driving means in the low and intermediate speed ranges while both the governor and tachometer signals are used for control in the higher speed range.

The differentials can be coupled to the tracer head signal outputs through suitable driving means, such as D.C. servo-motors energized respectively by the output signals. The differentials form part of the governors respectively and are also related, as aforesaid, to the speed of the lathe headstock. Ratio adjusting means desirably are inserted between the headstock and the differentials to enable the preselection of rates of tool feed. Thus, the lathe headstock functions as the primary speed governor and the driving means energized by the tracing signal components serve as secondary speed governors respectively for the tool feed driving means, with the driving means being the followers.

With this arrangement, the clutches formerly used between the hydraulic drives and the lathe carriage or cross slide are eliminated, while the power train associated therewith is greatly simplified. The loading on control arrangements exemplified herein, moreover, is essentially constant and light.

A consistent tool feed pattern for the lathe or other machinery requiring similar tool control is produced in terms of fractional inches per revolution of the workpiece or headstock. The tool feed pattern, resulting from the tool control circuit of the invention, attains whether flat or circular contours are being cut. Moreover, precision contours, as traced by the tracing head, are related accurately to the workpiece, and excellent speed regulation is obtained.

These and other objects, features and advantages of the invention will be elaborated upon during the forthcoming description of certain presently preferred embodiments of the invention together with presently preferred methods of practicing the same.

In the accompanying drawings, there have been shown certain presently preferred embodiments of the invention together with presently preferred methods of practicing the same, wherein:

The drawing shows a schematic, mechanical and electrical diagram of a tool feed control arrangement of the invention.

Referring now more particularly to the drawing, the exemplary form of the invention shown therein is a controlled feed system adapted for use with an automatic lathe 11 and including a pair of suitable tool driving means 10 and 12 for the longitudinal or carriage feed and for the cross feed or slide respectively. In this example, the driving means 10 and 12 are hydraulic motors, each controlled by a servo-valve 14 or 16. The servo-valves 14 and 16 are energized respectively by X and Y signals generated by a conventional signal generating circuit 18 coupled to a conventional template tracing head 20. The tracing head normally engages a template (not shown) held by template bars 13 of the lathe 11. The tracing signals are supplied to the servo-valves through output leads 22 and 24 of the signal generating circuit, and the flow of hydraulic fluid to the motors 10 and 12 through connecting conduits 26 and 28 respectively is controlled respectively by the servo-valves 14 and 16. The valves are coupled to a suitable source (not shown) of the hydraulic fluid as denoted by conduit portions 30 and 32.

To the input area of the signal generating circuit 18 the tracing head output is conducted through lead 34. After passing through the tracing control circuit indicated generally by the reference character 38, the tracing signal is then fed to a pair of demodulating circuits 48 and 50 which separate the amplified signal into X and Y component signals appearing respectively at the demodulating output terminals and corresponding respectively to the X and Y components of motion of the tracing head 20. The demodulator outputs are fed respectively to a pair of potentiometers 52 and 54, which desirably are adjustable simultaneously as denoted by the common operator 56, in order to adjust the strength of the signals conducted to the modulator circuits 58 and 50 respectively. The outputs of the latter circuits are conducted through leads 22 and 24 to operate the servo-valves 14 and 16 as aforesaid.

Each of the hydraulic motors 10, 12 is coupled to a tachometer 62 and 64, the output of which is fed back through conductor 66 or 68 to the associated one of the X and Y signal modulators 58, 60. The tachometers 62, 64, therefore, partially govern the associated hydraulic motors 10, 12, at least in the higher speed ranges thereof. Hydraulic motors 10 and 12 are coupled respectively to feed screws 69 and 71 actuating the carriage 73 and cross slide 75 for the lathe tool or the like (not shown), through suitable gear reduction units denoted generally by reference characters 70 and 72.

The output of each hydraulic motor 10 or 12 also is coupled to a synchro system 74 or 76, forming part of the aforementioned governor system. In this example the synchro systems 74, 76 each include a pair of selsyn motors 78 and 80, the stators of which are interconnected, while the rotors of the selsyn motors 78 are coupled respectively to hydraulic motors 10 and 12 for rotation thereby. The rotors of the selsyn motors 80, on the other hand, are coupled respectively to the outputs, denoted by reference characters 82 and 84 of mechanical differentials 86 and 88 respectively, whereby an error signal can be generated in each of the synchro systems 74 and 76, when the desired output speed of the associated tool driving means 10 or 12 is mismatched relative to the output of control speed of the associated differentials 86 or 88. As described more fully below, the control signals generated in the selsyns 80 by the differential outputs 82 and 84 are both related to the speed of the lathe headstock, but are each related respectively to the X and Y output signals of the signal generating circuit 18 and tracing head 20.

If the hydraulic motors 10 and 12 are energized at the proper speed, i.e., are driving the aforementioned feed screws 69, 71 or the like at the proper rates, no error signals are generated by the rotors of the selsyn motors 78. However, if one or both of the hydraulic motors 10, 12 are energized at the improper output speed an error signal appears on one or both of the synchro feed back conductors 90, 92, which are coupled respectively to the input conductors 22 and 24 of servo-valves 14, 16. Thus, the aforementioned error signal or signals provides the proper degree control of the servo-valves 14, 16 to control the longitudinal and cross slide feeds in accordance with the desired tool feed pattern. As pointed out previously, particularly in the higher speed ranges of the hydraulic motors 10, 12 the aforementioned error signals in feedback conductors 90, 92 cooperate with the tachometer control signals in feedback conductors 66, 68.

In order to provide both the longitudinal and cross feeds of the lathe tool with a selected and constant fractional inch per workpiece revolution control, the aforementioned governors including synchro systems 74 and 76 are arranged to produce a composite control signal and thus are related both to the revolution speed of the workpiece or headstock of the lathe and respectively to speeds of driving means 108 and 110 energized by the X and Y tracing signals, as described more fully below. The arrangement, in accordance with the invention, for accomplishing this includes the aforementioned mechanical differentials 86 and 88, each having a pair of input shafts 94 and 96, and the output shaft 82 or 84 coupled as aforesaid to the rotor of the associated selsyn 80 forming part of the synchro system 74 or 76. The input shafts 94 and 96 of the differentials 86 and 88 are driven simultaneously by another selsyn motor 98 which is connected through conductor means 100 to selsyn motor 102. The selsyn 102 is coupled to the headstock or spindle 104 of the lathe through a variable ratio gearing unit 106. Therefore, both the longitudinal and cross tool feeds of the lathe are controlled by the lathe spindle speed through the synchro systems 74 and 76 and the mechanical differentials 86 and 88. However, the coupling ratio between the mechanical differentials 86, 88 on the one hand and spindle 104 of the other, is varied by means of the ratio-adjusting gearing unit 106, whereby the the fractional inch per workpiece revolution of the tool feed selectively is varied. This portion of the control arrangement acts as the primary governor upon the rate of tool movement in both the longitudinal and cross-feed directions and is related to the roatry speed of the workpiece.

The other input shaft 94 or 96 of each differential 86 or 88 is driven by a tachometer controlled servo-motor 108 or 110 respectively, each of which energized by the demodulated X or Y signal respectively conducted from the signal generator 18 through electrical lead 112 or 114. With this latter arrangement, the control input to each synchro system 74 or 76 is related to a second governing signal supplied to the input shaft 96 of the associated differential 86 or 88, and thus the servo-motors 108, 110 are the secondary governors respectively upon the rates of tool movement in the longitudinal and cross-feed directions. Therefore, the tool feed is governed in both directions primarily by the speed of workpiece rotation and in each direction secondarily by the speed of servo-motor 108 or 110 and the related X or Y tracing signal. Therefore, a feedback or error signal will be supplied through conductor 90 or 92 to the associated servo-valve 14 or 16 when the hydraulic motor 10 or 12 drives the associated rotor of the synchro system 74 or 76 at a differential or error speed relative to the compositely controlled reference speeds of the rotors of the selsyns 80.

The synchros 74 and 76 in conjunction with the tachometers 62 and 64 likewise coupled to the hydraulic drives 10 and 12 afford a fine degree of control over the longitudinal and cross tool feeds respectively. By relating the control of each hydraulic drive 10 or 12, in a differential speed mode, to both the rotative speed of the workpiece and to the X and Y displacements of the tracing head, expressed as rotative speeds by the servo-motors 108 and 110, the movements of the lathe tool are controlled precisely as to the rotative speed of the workpiece as well as to the displacements of the template control tracing head. More specifically, each servo-valve 14 or 16 is controlled by a feedback signal from the tachometer 62 or 64 of the associated hydraulic drive before the associated X or Y signal is modulated for the purpose of combining this signal with the signal from the tracing head control which is primarily a speed signal at this location. In other words these signals from 62 and 64 are rate feed back signals. As pointed out previously, this form of control is more effective in the higher speed ranges of the hydraulic drives. At the same time the servo-valve is controlled by a feedback error signal generated by the synchro system 74 or 76 and also related to the X or Y signal component. In this case, however, the error signal is fed back to the servo-valve electrical input after modulation of the X or Y signal for the purpose of providing a position signal to control the servo-valves 14 or 16 whenever the combined speed signal from the modulators is very small and relatively ineffective.

From the foregoing it will be apparent that novel and effective forms of controlled feed systems have been disclosed herein, which have general application not limited to the specific control of lathe tools. Therefore, it will be apparent that the control arrangement of my invention can be utilized for controlling other mechanical movements, which are not limited to movements in two dimensions but rather a tool or other movable member having movements in one or all three dimensions can be controlled with equal facility through the use of an appropriate number of the composite governing systems arranged in accordance with the invention. Therefore, while there have been shown and described certain presently preferred embodiments of the invention together with preferred methods of practicing the same, it is to be distinctly understood that the invention is not limited thereto, but may be otherwise variously embodied and practiced within the scope of the following claims.

I claim:

1. In a governing system for controlling the output of driving means coupled to a first member for movement thereof relative to a second movable member, the combination comprising servo means for controlling said driving means and having an input signal circuit coupled to a signal source, differential means having an output coupled to said signal circuit in feedback relationship, said differential means having a first input coupled for energization by said signal source and a second input coupled for energization by movements of said second member.

2. The combination according to claim 1 wherein said differential means output is coupled to said signal input circuit through error signal generating means coupled to said driving means output to produce an error signal in said signal input circuit.

3. The combination according to claim 2 wherein said first differential means input is coupled to said signal source through servo motor means, and said error signal generating means is speed-sensitive.

4. The combination according to claim 3 characterized in that said second differential input is coupled to said second moving member through a selsyn system.

5. The combination according to claim 4 characterized in that said selsyn system is coupled to said second movable member through variable ratio coupling means whereby the rate of movement of said first member relative to that of said second member can be selectively varied.

6. The combination according to claim 1 characterized in that rates of movement of said first member are controlled in at least two dimensions relative to the rate of movement of said second member, servo means and driving means for each dimension are provided, and differential means coupled as set forth in claim 1 are provided for each of said dimensions.

7. The combination according to claim 6 wherein the inputs of said servo means are controlled by a signal generator coupled to a template tracing head, said signal generator producing at least two signal outputs connected respectively to said servo inputs said signals corresponding to X and Y coordinates of movement of said tracing head.

8. The combination according to claim 1 characterized in that said driving means is coupled to tachometer means, the signal of output of which is coupled in feedback relation to said servo input circuit.

9. The combination according to claim 8 wherein said signal source is a signal generator having demodulator and modulator circuits and a signal output connected to said servo input, said error signal is fed back through circuit means connected between said modulator circuit and said signal generator output, and said tachometer feedback is conducted through circuit means connected between said demodulator and said modulator circuits.

10. The combination according to claim 1 wherein said second member is a rotatably supported workpiece, said first member is a machine tool mounted for movement in longitudinal and cross-feed relationship to said workpiece, said signal source is template tracing means including a signal generator having longitudinal and cross tool feed signal outputs, and said driving means are coupled through said servo means to said signal outputs for driving said tool in the longitudinal and cross-feed directions thereof respectively.

11. The combination according to claim 10 characterized in that a pair of differential means are coupled respectively to said longitudinal and cross drive means through error signal generating means coupled respectively to the longitudinal and cross-feed outputs of said signal generator.

12. The combination according to claim 10 wherein a first input of each of said differential means is coupled to the associated signal output of said signal generator and a second input of each of said differential means are coupled to said workpiece for simultaneous actuation thereby.

13. The combination according to claim 12 characterized in that said second differential inputs are coupled through a selsyn system and through a ratio adjustment unit to said workpiece.

References Cited

UNITED STATES PATENTS

| | | | |
|---|---|---|---|
| 2,939,287 | 6/1960 | Capron et al. | 82—14 |
| 3,119,291 | 1/1964 | Mizunuma et al. | 82—14 |

GERALD A. DOST, Primary Examiner

U.S. Cl. X.R.

90—13

UNITED STATES PATENT OFFICE
CERTIFICATE OF CORRECTION

Patent No. 3,478,626　　　　　　　　　　　　　　　　　November 18, 196'

George A. Stelmach

It is certified that error appears in the above identified patent and that said Letters Patent are hereby corrected as shown below:

Column 4, line 16, "50" should read -- 60 --.  Column 5, line 19, cancel "the", third occurrence.

Signed and sealed this 14th day of April 1970.

(SEAL)
Attest:

Edward M. Fletcher, Jr.　　　　　　　　　　　WILLIAM E. SCHUYLER, JR.
Attesting Officer　　　　　　　　　　　　　　　　Commissioner of Patents